A. B. FUHR.
VEHICLE WHEEL.
APPLICATION FILED MAR. 8, 1922.
1,432,390. Patented Oct. 17, 1922.
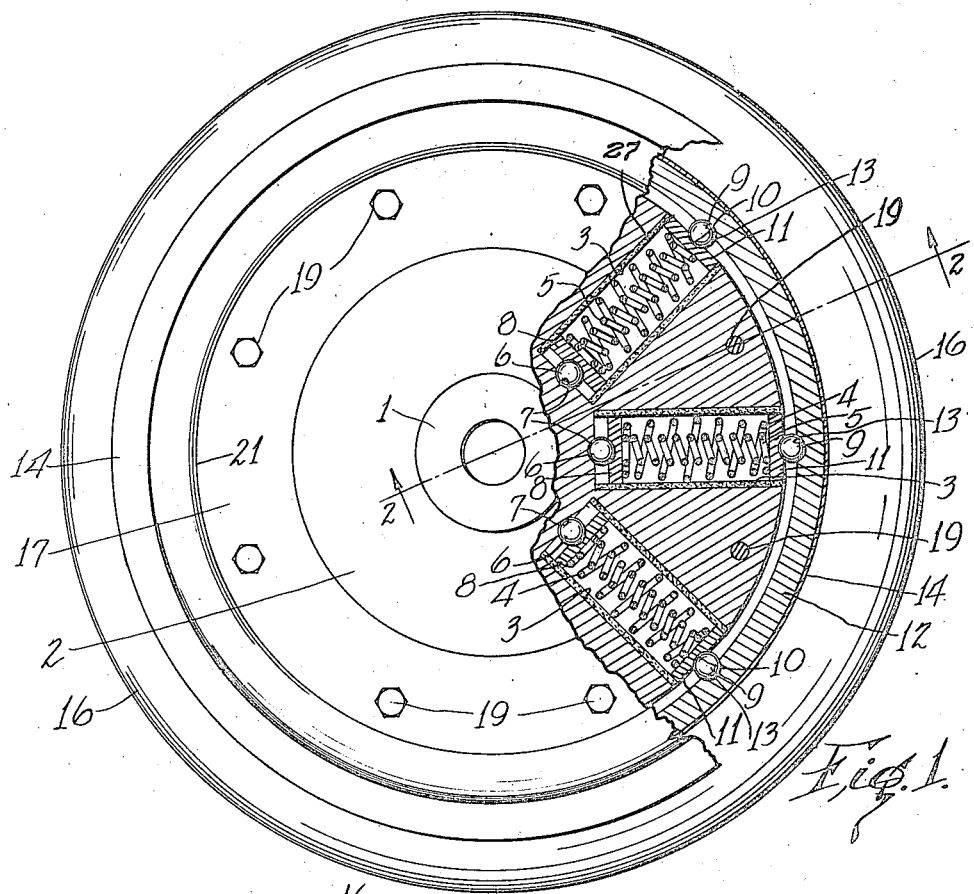
Fig. 1.
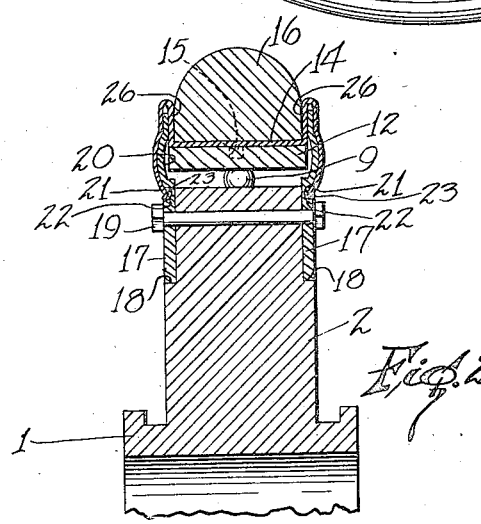
Fig. 2.
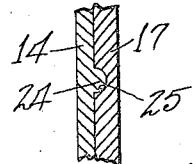
Fig. 3.
INVENTOR
A. B. Fuhr
BY
Munn & Co.
ATTORNEYS
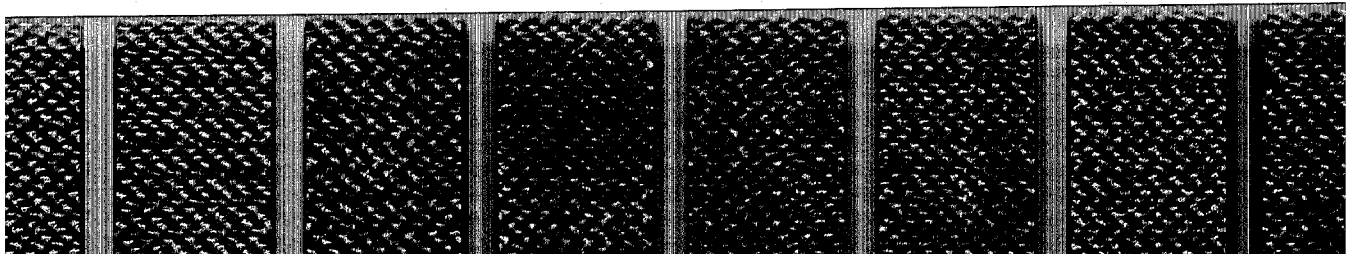

Patented Oct. 17, 1922.

1,432,390

UNITED STATES PATENT OFFICE.

ALBERT B. FUHR, OF MACOMB, ILLINOIS.

VEHICLE WHEEL.

Application filed March 8, 1922. Serial No. 541,991.

*To all whom it may concern:*

Be it known that I, ALBERT B. FUHR, a citizen of the United States, and a resident of Macomb, in the county of McDonough and State of Illinois, have invented a new and useful Improvement in Vehicle Wheels, of which the following is a full, clear, and exact description.

My invention relates to improvements in vehicle wheels, and it consists in the combinations, constructions, and arrangements herein described and claimed.

An object of my invention is to provide an improvement over that form of the device shown in my Patent No. 1,387,148, of August 9, 1921. In said prior patent there was disclosed a vehicle wheel in which a felly was resiliently mounted and was enclosed between two sides of the wheel, the sides being adapted to partially enclose a solid rubber tire. The construction of the present device is primarily designed to prevent dust and dirt from entering between the sides of the wheel and the tire and lodging in the spring means which resiliently supports the felly. To this end, I provide the rim of the tire with channel-shaped sides which are adapted to enclose the peripheries of the side members which are disposed on each side of the tire, whereby dust or dirt is prevented from entering between the tire and the sides, and gaining admission to the spring means.

A further object of my invention is to provide a device of the character described which resembles the ordinary disc wheel in construction.

A further object of my invention is to provide a device of the character described which is readily assembled, and which is not likely to easily get out of order.

Other objects and advantages will appear in the following specification, and the novel features of the invention will be particularly pointed out in the appended claims.

My invention is illustrated in the accompanying drawings, forming part of this application, in which—

Figure 1 is a side elevation of the device, portions thereof being shown in section, Figure 2 is a section along the line 2—2 of Figure 1, and Figure 3 is a sectional view of a portion of the device.

In carrying out my invention, I provide a hub 1 which has a disc-shaped portion 2 extending from the center thereof. The portion 2 has a plurality of radially extending recesses 3 therein, in which are disposed springs 4 and 5. The cylindrical recesses 3 are lined with a fibrous packing, or the like, which prevents the springs from engaging with the walls of the recesses 3. A ball bearing 6 is disposed in a pocket 7 at the inner end of each recess, and is adapted to support a disc 8. In like manner, a ball bearing 9 is disposed in a pocket 10 in a disc 11, the disc being slidably received in the outer end of the recess 3. The spring 4 is preferably slightly reduced in diameter at each end thereof, as is clearly shown in Figure 1, and the spring 5 is smaller in diameter than is the spring 4 and is disposed within the spring 4. The springs 4 and 5 bear against the discs 8 and 11. The tapering of the spring 4 prevents the greater portion thereof from engaging with the wall of the bore, thereby reducing the friction between the spring and the wall of the bore.

A felly 12 is disposed around the periphery of the portion 2, and is spaced therefrom by means of the ball bearings 9. The felly has pockets 13 therein in which the balls 9 are received. From this construction it will be apparent that the felly 12 is yieldingly supported by the portion 2 and is adapted to move slightly with respect to the portion 2. A tire rim 14 is secured to the felly 12 by means of screws 15, and in turn carries a hard rubber tire 16. The felly 12 and the tire 16 are held against lateral movement by means of side members 17. It will be noted from Figures 1 and 2 that the side members 17 are in reality rings which are received in annular recesses 18 in the portion 2. The sides 17 are secured to the portion 2 by means of bolts 19 which are extended through the portion 2 and through the sides 17.

As will be noted in Figure 2, the inner surfaces of the sides 17 are provided with annular grooves 20, the grooves being disposed adjacent to the sides of the felly 12. It will be therefore be noted that the felly 12 is adapted to move slightly with respect to the portion 2 without frictionally engaging the sides 17. This is a distinct advantage over my prior patent, since it will be observed that the felly 12 is constantly in vibration, due to the inequalities of the road bed, and would necessarily cause a great amount of friction between the felly 12 and the sides if the felly engaged or contacted the sides. By spacing the sides of the felly 12 from the sides 17, this friction is entirely eliminated.

The rim 14 is bent upwardly so as to engage the sides of the tire 16 and is then bent back upon itself so as to enclose a portion of the sides 17. The edges 21 of the rim 14 are provided with beads which are disposed in the annular grooves 22 in the outer surfaces of the sides 17. A gasket 23 is interposed between the sides 17 and the beads 21. The rim 14 is obviously composed of spring qualities so as to yieldingly engage with the outer surface of the sides 17. It will also be observed that the portions of the rim 14 which enclose the outer peripheries of the sides 17, are spaced therefrom so as to permit a slight movement of the tire 16 with respect to the portion 2. From this construction, it will be observed that dirt or dust cannot enter between the tire 16 and the sides 17 so as to lodge in the recesses 3.

The portions 26 of the rim 14 are provided with a plurality of radially extending projections 24 which are received in radially extending depressions or grooves 25 in the side members 17. It will therefore be apparent that the rim 14 is prevented from rotation with respect to the sides 17, since the projections 24 are locked in the grooves 25.

From the foregoing description of the various parts of the device, the operation thereof may be readily understood. It will be obvious that the springs 4 and 5, the ball bearings 6 and 9, and the discs 8 and 11 are assembled in the portion 2 before the felly 12 is disposed therearound. The tire 16, with the rim 14, is then secured to the felly. The felly is spaced from the portion 2 by means of the spring pressed balls 9, and is prevented from lateral movement by the sides 17 which engage with the rim 14. When the wheel strikes an obstruction, such as a bump or the like in the road bed, the portion of the tire striking this obstruction will be forced upwardly, which in turn will compress the springs 4 and 5 adjacent to this point, thus absorbing the shock. By providing double springs 4 and 5, the resiliency of the device is made greater. The packing 27 in the recesses 3 prevents the springs 4 from engaging with the walls of the recesses, and therefore obviates any undue heating of the springs due to friction. The principal advantage of this device lies in the fact that the rim 14 is so fashioned as to enclose the peripheries of the members 17, whereby dirt, dust, or the like is prevented from passing between the tires 16 and the sides 17 and becoming lodged in the recesses 3. The portions of the rim 14 disposed on the outer surfaces of the sides 17 are resilient enough so as to be able to move slightly with respect to the grooves 22 when the tire 16 is moved relative to the portion 2. The gaskets 23, disposed in the grooves 22, act as a further means for preventing dust and dirt from entering between the rim 14 and the sides 17. As heretofore stated, undue friction is reduced to a minimum by constructing the felly 12 and the sides 17 so as to prevent the sides of the felly from engaging with the inner surfaces of the sides 17.

From the foregoing it will be apparent that I provide an efficient device in which it is impossible for dirt and dust to enter the spring means which supports the tire, and in which the friction of the felly with respect to the sides 17, is reduced to a minimum. The device is relatively simple in construction, and is not likely to easily get out of order.

I claim:

1. A vehicle wheel comprising a body portion having a peripheral edge, a solid tire disposed around the periphery, yielding means disposed between said tire and said body, a side member disposed on each side of said tire and being carried by said body, said side members being spaced from said tire, and a rim for said tire, said rim being fashioned so as to enclose the outer peripheral edges of said side members.

2. A vehicle wheel comprising a body portion having a peripheral edge, a felly disposed around said edge and being yieldingly carried thereby, a tire rim carried by said felly and having a tire therein, a side member disposed on each side of said rim and having an annular groove in its outer surface, and a gasket disposed in each groove, said rim being fashioned so as to enclose the outer peripheries of said side members and to have its sides terminating in said grooves.

3. In a vehicle wheel, a body portion, a felly yieldingly carried by said body portion, a tire rim carried by said felly, a side member disposed on each side of said rim and being secured to said body, and means carried by said rim and engaging with said side members for preventing the rotation of said rim with respect to said side members.

ALBERT B. FUHR.